March 24, 1953

O. L. SMITH 2,632,388

COMBINATION RECEIVING TRAY AND
COVER FOR DUPLICATING MACHINES

Filed July 12, 1948

Inventor:
Ored Lee Smith
By: Zahel & Dritbaugh
Attorneys

March 24, 1953

O. L. SMITH 2,632,388

COMBINATION RECEIVING TRAY AND
COVER FOR DUPLICATING MACHINES

Filed July 12, 1948

Inventor:
Ored Lee Smith
By: Zabel & Gritzbaugh
Attorneys

March 24, 1953

O. L. SMITH 2,632,388

COMBINATION RECEIVING TRAY AND
COVER FOR DUPLICATING MACHINES

Filed July 12, 1948

Inventor:
Ored Lee Smith
By Zabel & Gritzbaugh
Attorneys

March 24, 1953

O. L. SMITH

2,632,388

COMBINATION RECEIVING TRAY AND
COVER FOR DUPLICATING MACHINES

Filed July 12, 1948

Inventor:
Ored Lee Smith
By: Zabel & Fritzbaugh
Attorneys

March 24, 1953

O. L. SMITH

2,632,388

COMBINATION RECEIVING TRAY AND
COVER FOR DUPLICATING MACHINES

Filed July 12, 1948

Inventor:
Ored Lee Smith
By Zahrt & Gritzbaugh
Attorneys

Patented Mar. 24, 1953

2,632,388

UNITED STATES PATENT OFFICE 2,632,388

COMBINATION RECEIVING TRAY AND COVER FOR DUPLICATING MACHINES

Ored Lee Smith, Oak Park, Ill., assignor to Ditto, Incorporated, Chicago, Ill., a corporation of West Virginia Application July 12, 1948, Serial No. 38,278

3 Claims. (Cl. 101—132.5)

1

The present invention relates to a duplicating machine of the type that employs a master sheet that is mounted on a rotatable drum and copy sheets are brought into pressure contact with this master sheet for transferring typed material from the master sheet onto the copy sheets. In this type of machine a pressure roller is disposed directly and firmly against the periphery of the drum and at the front side of the machine there is provided a forward paper tray upon which are stacked a plurality of copy sheets. From this forward paper tray the copy sheets are fed individually between the pressure roller and the drum while the drum is rotated and then these sheets are deposited one at a time in a receiving paper tray that is disposed at the back of the machine. The present invention is concerned more particularly to a machine of this type wherein the receiving paper tray serves both as a tray for receiving the copy sheets and as a cover for covering the rotatable drum and the mechanism adjacent to the drum.

One object of the present invention is to provide a combination paper tray and cover for a machine of this type. This is accomplished in a simple manner by a device that is simple both in structure and in operation and yet by an arrangement that serves very effectively both as a paper tray and as a machine cover.

In machines of this type the peripheral surface of the pressure roller is composed of some resilient material, such as rubber. Thus when the rotatable drum and the pressure roller are in pressure contact with each other the rubber surface of the pressure roller is somewhat flattened in the region of contact. During operation of the machine the area of contact between the rotatable drum and the pressure roller moves about the peripheries of both members but while the machine is not in use these areas remain stationary and after an extended period of non-use of the machine, the pressure roller is very apt to develop a flattened region over its peripheral surface. This, of course, is objectionable because unless the periphery of the pressure roller is truly cylindrical the amount of pressure between the pressure roller and the drum will vary during machine operation. Such a condition produces copy sheets having non-uniform inked impressions including both light and dark areas.

It is another object of the present invention to insure against this undesirable condition by providing an arrangement that releases the contact pressure between the pressure roller and the rotatable drum. This is accomplished in conjunction with the combination paper tray and machine cover to the extent that it is impossible to completely close the machine cover until the contact pressure between the pressure roller and the rotatable drum has been released. Thus each time use of the machine has been completed and the operator closes the cover, he must first release the contact pressure between the pressure roller and the drum. Failure to so release the contact pressure is immediately called to the operator's attention when he moves the cover to closed position and this constant reminder serves as a safeguard against the possibility of closing the machine and allowing it to remain idle for an extended period while the pressure contact between the pressure roller and the rotatable drum is maintained.

Thus it is another object of the present invention to provide an arrangement for releasing pressure contact between the pressure roller and the rotatable drum that serves as a constant reminder to the machine operator at the time the machine is being closed.

The foregoing constitute some of the principal objects and advantages of the present invention, others of which will become apparent from the following description and the drawings, in which.

For purposes of illustration a single embodiment of the present invention has been selected and will be described hereinafter. It is recognized, however, that numerous modifications may be made in the embodiment as shown without departing from the intended scope and spirit of the invention.

Figures 1, 2:
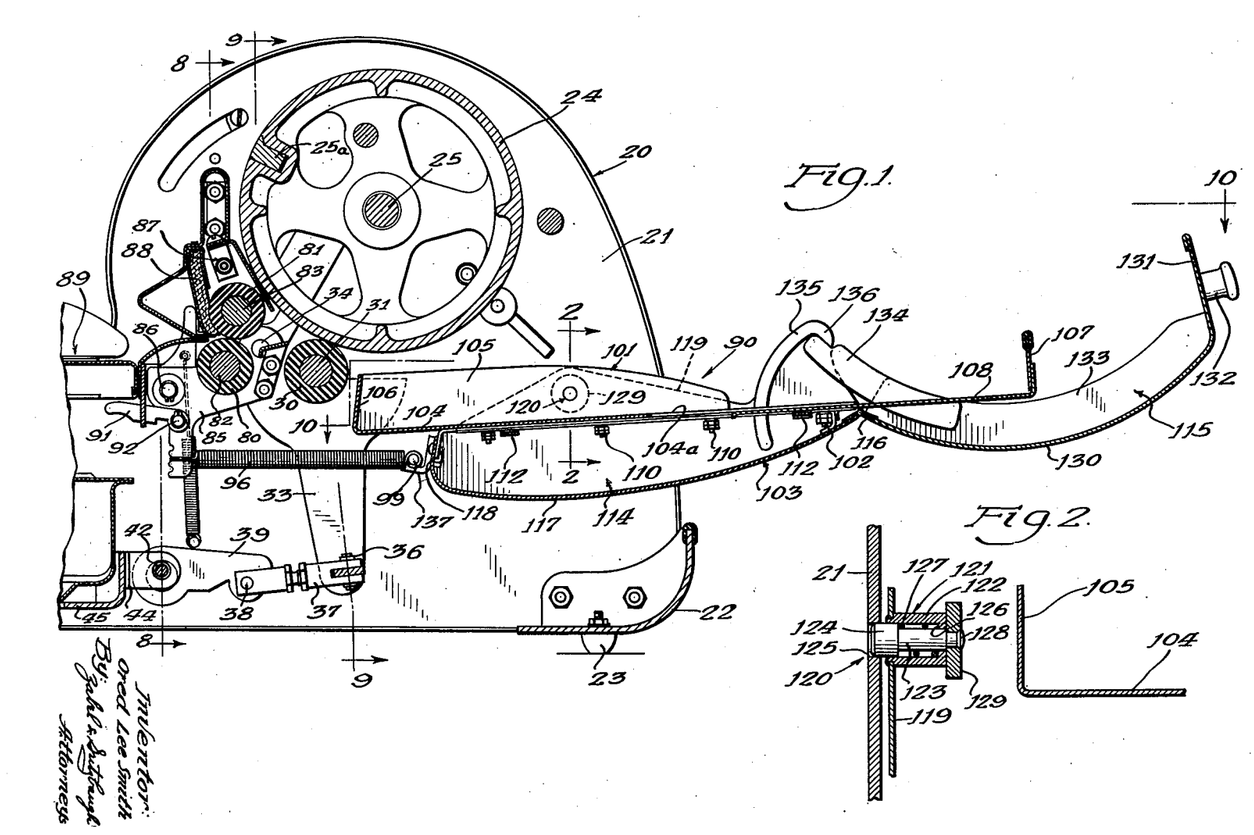
Fig. 1 is a fragmentary, longitudinal, vertical sectional view through a duplicating machine embodying the present invention and showing the combination receiving tray and cover in its open position.
Fig. 2 is a fragmentary, vertical sectional view taken through the combination receiving tray and cover, the view being taken on the line 2—2 of Fig. 1.
Figure 8:
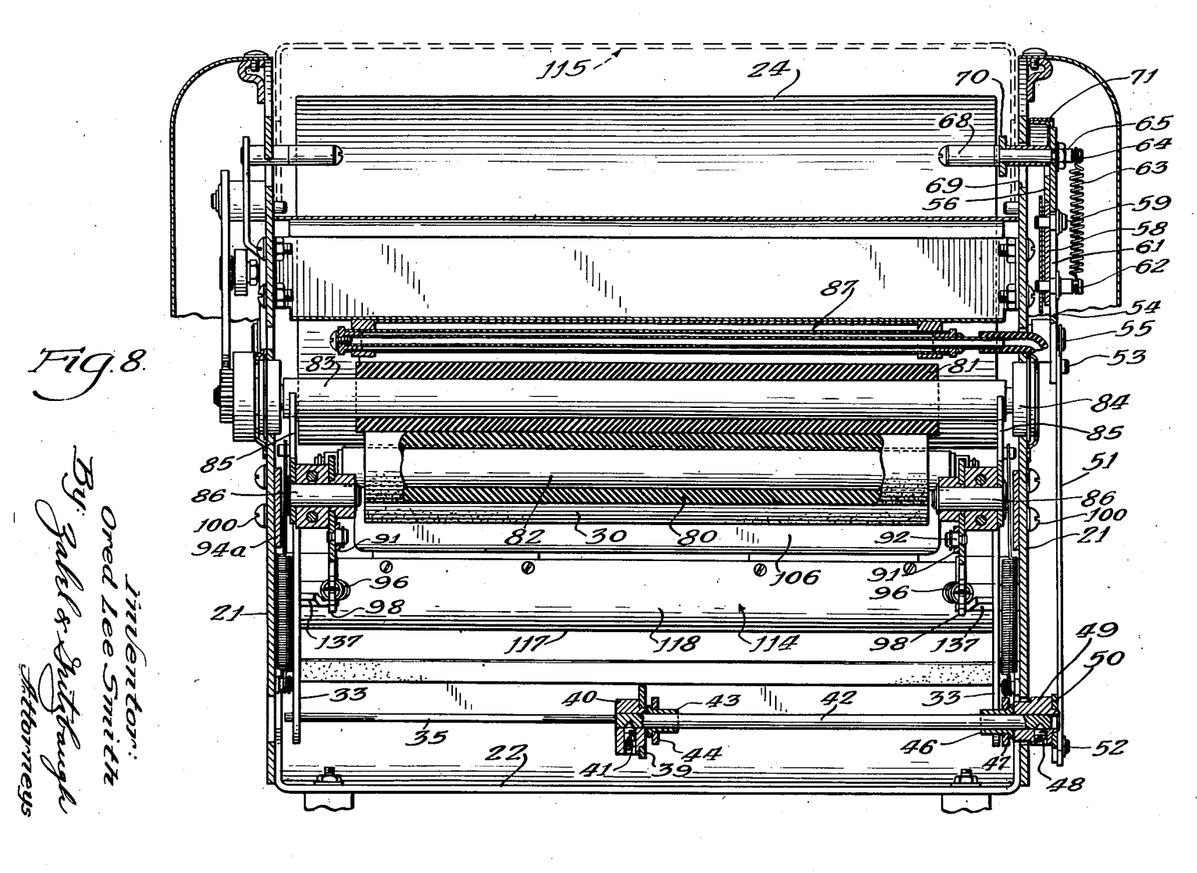
Fig. 8 is a vertical, sectional view through the machine, the view being taken along the line 8—8 of Fig. 1.
Figure 9:
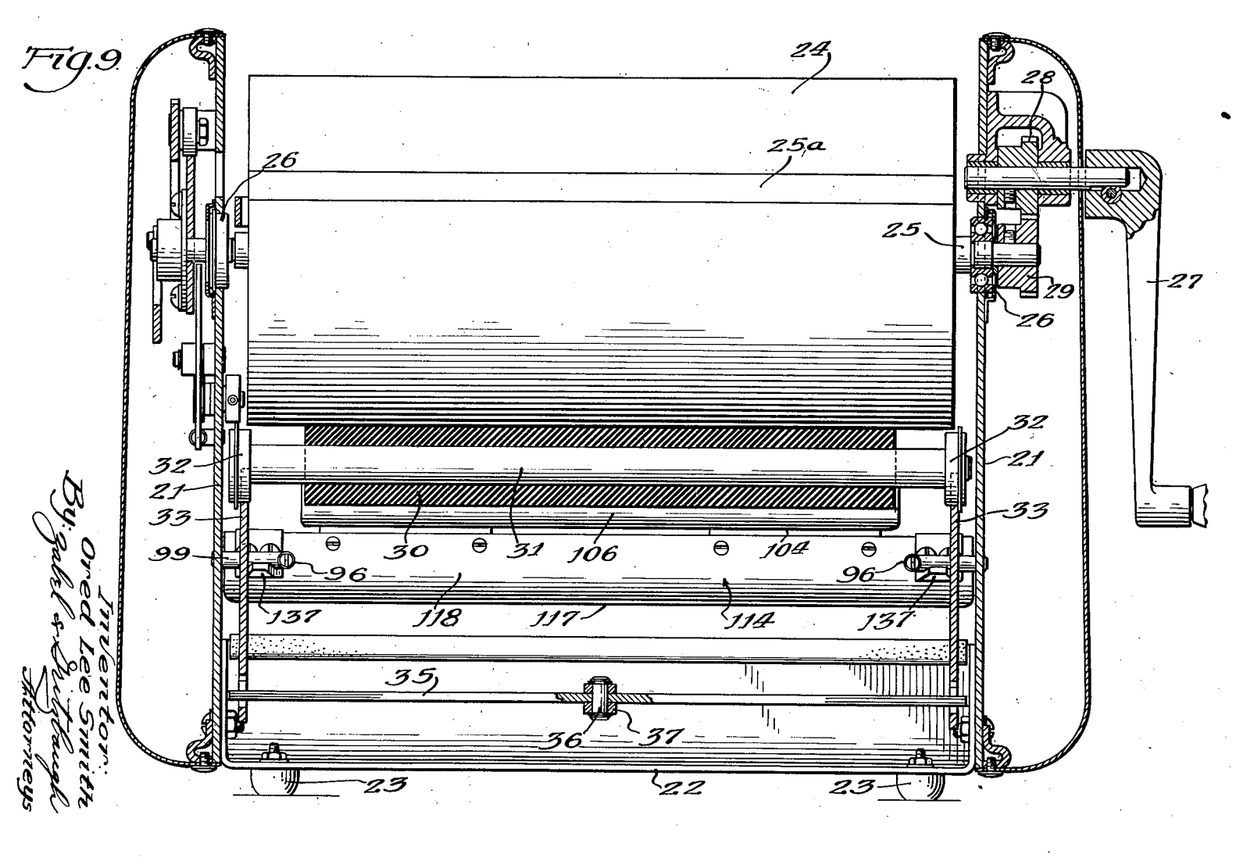
Fig. 9 is a vertical, sectional view through the machine, the view being taken along the line 9—9 of Fig. 1.

Referring to the drawings the present invention is illustrated as embodied in a duplicating machine generally indicated at 20 that includes a machine frame comprising spaced side walls 21 (see Figs. 8 and 9) connected by transverse framing members, one of which is indicated at 22 in Figs. 1, 8 and 9. The machine is supported on a plurality of feet, some of which are indicated at 23.

Figure 5:
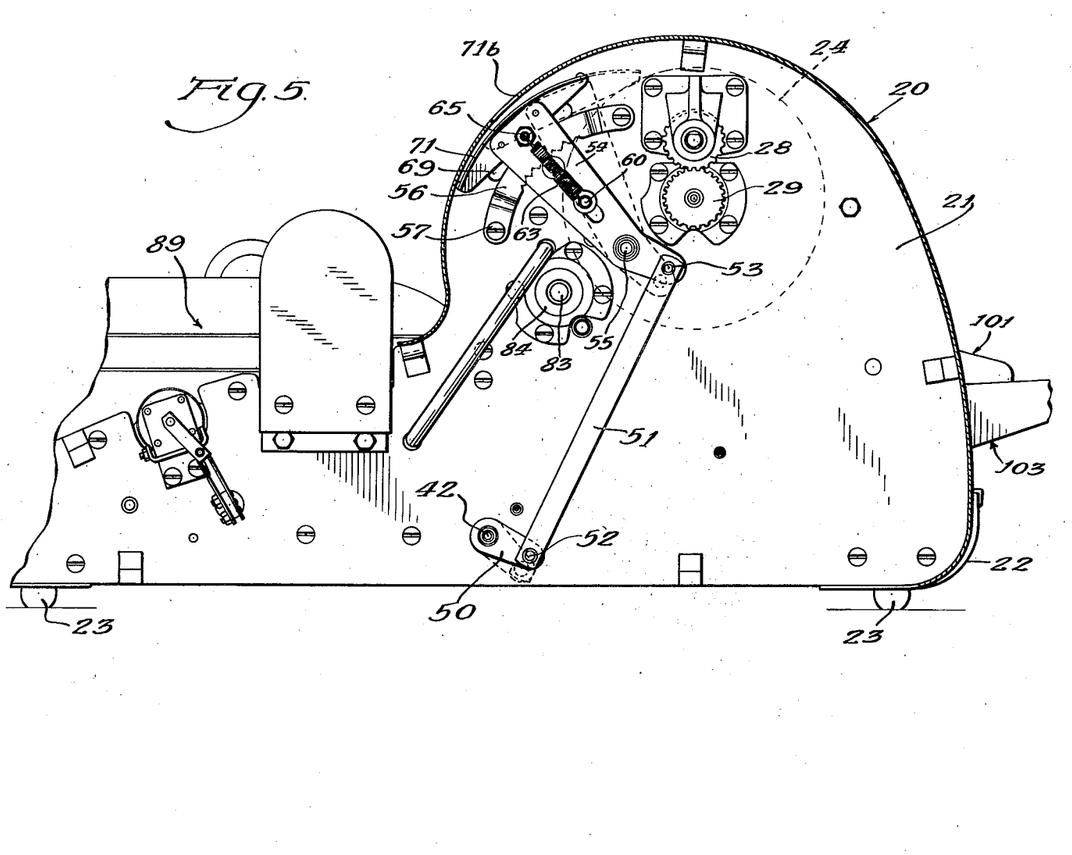
Fig. 5 is a longitudinal sectional view (with a portion broken away) through the duplicating machine illustrated in Fig. 1 but showing in particular the pressure roller releasing mechanism.

Rotatably mounted on the machine and generally in the side walls 21 is a drum 24 that is mounted on a shaft 25 (Fig. 1). This drum 24 is adapted to receive about its peripheral face a master sheet (not shown) that is locked or clamped in place by a clamping device generally indicated at 25a. As best shown in Figs. 5 and 9 the shaft 25 is journalled in bearings 26 and is rotated by means of a hand crank 27 that is geared to the shaft 25 by means of gears 28 and 29. Though the present machine is illustrated as a manual machine powered through a hand operated crank 27 it is, of course, recognized that this machine may be powered by an electric motor or the like in some conventional manner.

Figures 12, 13:
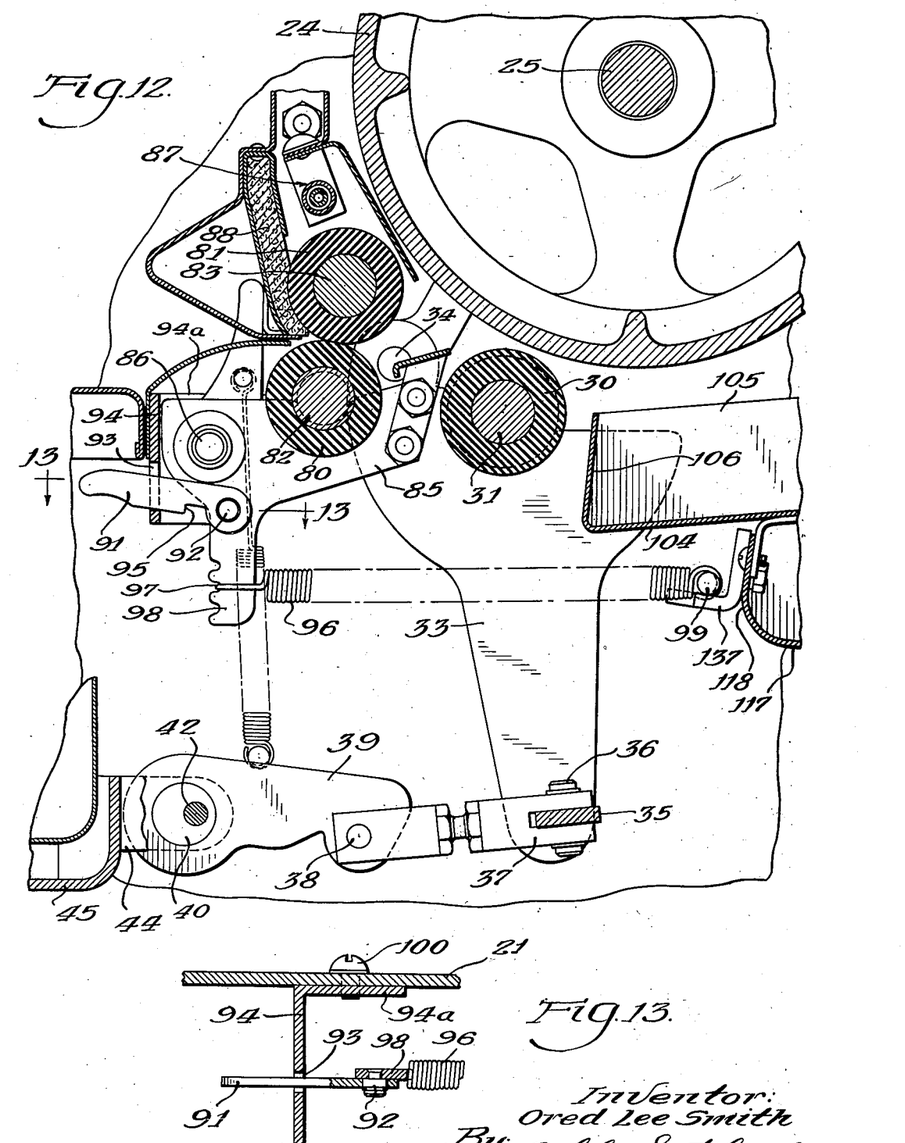
Fig. 12 is an enlarged, vertical, longitudinal, sectional view through a portion of the machine illustrated in Fig. 3 and showing particularly the lower feed roller in engagement with the upper feed roller and the pressure roller disposed out of pressure contact with the drum.
Fig. 13 is a fragmentary, horizontal, sectional view through a portion of the machine, the view being taken along the line 13—13 of Fig. 12.

A pressure roller 30 mounted on a shaft 31 is disposed parallel to the drum 24 and is journalled as at 32 at its opposite ends in a pair of spaced cradles 33. Each of the cradles 33 is pivotally mounted as at 34 on the adjacent side wall 21 of the machine and as demonstrated by comparing the relative positions of pressure roller 30 in Figs. 1 and 12, the cradles 33 can pivot about their pivot points 34 so as to move the pressure roller 30 from a position in pressure engagement with the peripheral face of the drum 24 as shown in Fig. 1 to a withdrawn or pressure released position shown in Fig. 12 where the pressure roller 30 is out of engagement with the periphery of drum 24.

Figures 15, 16:
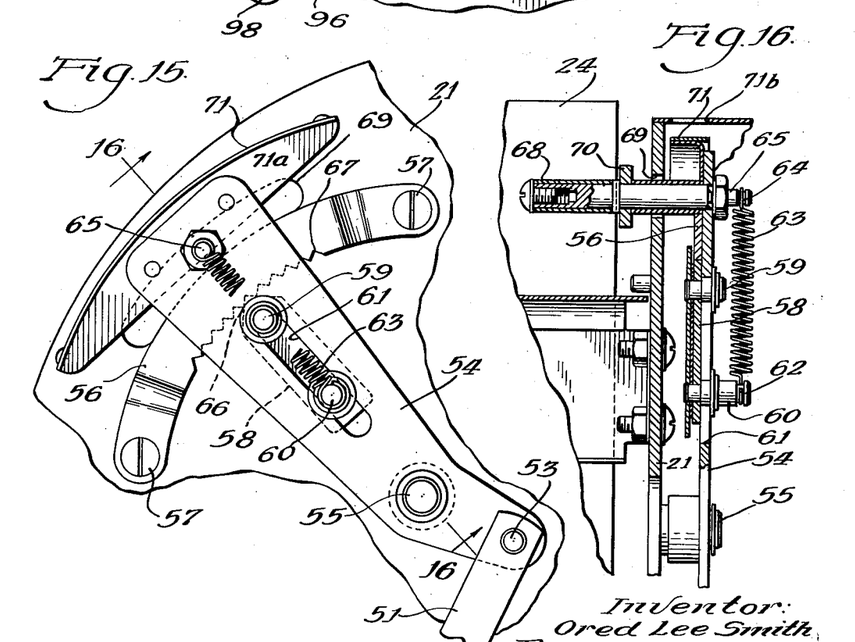
Fig. 15 is an enlarged, detail view of the operating arm and locking mechanism forming part of the pressure roller releasing mechanism.
Fig. 16 is a sectional view through the device shown in Fig. 15, the view being taken along the line 16—16 of Fig. 15.

As best shown in Figs. 1 and 9 the cradles 33 are connected at their lower ends by a connecting bar 35 to which is secured by means of a pin or rivet 36 a bifurcated link 37 that is disposed intermediate the ends of the connecting bar 35. This link 37 is connected at its free end as at 38 to one end of a crank arm 39 which in turn is mounted on an eccentric 40 that is keyed by a machine screw 41 to a shaft 42 (see Figs. 1 and 8). This shaft 42 at one end is journalled as at 43 in a bracket 44 that in turn is welded or otherwise secured to a rigid part 45 of the machine. The other end of the shaft 42 is journalled as at 46 in a bracket 47 that likewise is secured to a rigid part of the machine. Keyed to this last mentioned end of shaft 42 by means of a machine screw 48 or the like is a collar 49 that carries a crank arm 50 as best shown in Figs. 5 and 8. To the free end of this crank arm 50 is pivotally secured one end of a link 51 as at 52, the other end of which is pivotally secured as at 53 to one end of a bell crank 54. This bell crank 54 is pivoted as at 55 to adjacent side wall 21 of the machine. The bell crank 54 is adapted to pivot about its pivot point 55 so as to move the free end of the bell crank 54 in an arc over an arcuate shaped plate 56 that is screwed at both ends as at 57 to the side wall 21 of the machine. A detent 58 is disposed adjacent to the inside face of the bell crank 54 and is mounted on the bell crank 54 by means of upper and lower rivets 59 and 60 respectively that pass through an elongated slot 61 in the bell crank 54. The detent 58 is adapted to slide in the longitudinal direction along the bell crank 54 with the rivets 59 and 60 sliding lengthwise in the slot 61. To the free end of rivet 60 is secured as at 62 a spring 63 that is attached at its opposite end as at 64 to a lug 65 that projects outwardly from the bell crank 54 adjacent to the free end of the bell crank. This spring 63 normally maintains the detent 58 in its uppermost position with the upper rivet 59 engaging the upper extremity of the slot 61 (as shown in Figs. 15 and 16).

The upper end of the detent 58 is tapered to provide a point indicated at 66 that is adapted to engage notches 67 that are provided along the lower edge of the plate 56. The spring 63 normally holds the pointed end 66 of the detent 58 in engagement in one of the notches 67 but as force is applied to the bell crank 54 to move it in an arc in its pivot point 55, the pointed end 66 of the detent 58 is cammed out of the notch 67 when this force is sufficient to overcome the action of the spring 63. The position of the bell crank 54 can be adjusted relative to the arcuate plate 56 and can be locked in any selected position by cooperation between the detent 58 and the notches 67 in the bottim edge of the plate 56. An operating lever 68 (Figs. 8 and 16) is secured to the upper end of the bell crank 54 and projects through an arcuate slot 69 in the adjacent side wall 21 of the machine and operation of the bell crank 54 is effected by manual manipulation of this operating lever 68. Secured to the operating lever 68 is a stop member 70 as can be seen in Figs. 3, 4, 6, 8 and 16. When the bell crank 54 is disposed with the stop member 70 disposed at the extreme right of the arcuate plate 56 the cradle 33 is disposed in the position shown in Figs. 3 and 12 with the pressure roller 30 retracted and out of engagement with the peripheral surface of the drum 24. As the bell crank 54 is moved in a counterclockwise direction as viewed in Fig. 5, the pressure roller 30 is moved toward the drum 24 and is finally brought into engagement with the periphery of the drum. The degree of pressure between the pressure roller 30 and the drum 24 can be varied by further and selectively moving the bell crank in a counterclockwise direction as viewed from Fig. 5 and the selected position for the bell crank can be locked in the manner previously described by cooperation between the detent 58 and the notches 67 in the arcuate plate 56. It is apparent, of course, that the more pressure that exists between the pressure roller 30 and the drum 24, the darker will be the inked impressions on the copy sheets that are brought into contact with the master sheet on the drum. Thus there is provided a mechanism for selectively determining the darkness or lightness of the impressions that are to be made on the copy sheets.

As shown in Figs. 6, 7, 15 and 16, an indicating plate 71 of arcuate shape is secured to a bracket 71a that is attached to the upper end of the bell crank 54. This indicating plate moves with the bell crank past a window 71b (see Figs. 5 and 7) and is marked across its upper face with letters indicating various conditions of pressure contact between the pressure roller 30 and the drum 24, the letter "H" representing heavy pressure contact for heavy inked impressions on the copy sheets, the letter "M" indicating medium pressure contact to denote medium inked impressions on the copy sheets, the letter "L" representing light pressure contact to denote lightly inked impressions on the copy sheets and the letter "O" representing no pressure contact when the pressure roller is out of engagement with the drum.

Again referring to Fig. 1 the machine 20 also includes a pair of rollers 80 and 81 that serve as feed rollers. These rollers are mounted on shafts 82 and 83 respectively, shaft 83 being journalled as at 84 (see Fig. 8) at its opposite ends in the spaced side walls 21 of the machine frame. Shaft 82 is journalled in spaced cradles 85, each of which in turn is pivotally mounted as at 86 on the corresponding side wall 21 of the machine. The feed rollers 80 and 81 are normally disposed with their peripheral surfaces in engagement as shown in Fig. 1 and the upper feed roller 81 serves as a moistening roller, receiving its moistening fluid from a fountain generally indicated at 87 that is suitably mounted above the roller 81 in a manner more completely described in the copending application of Herman A. Genz, filed May 6, 1948 and bearing Serial No. 25,341. This fountain 87 receives a supply of fluid and is adapted to spray this fluid onto the peripheral face of the roller 81. A wick 88 is held in engagement with the peripheral face of the roller 81 and serves to spread the fluid from the fountain 87 in an even film over the face of the roller 81.

Disposed at the front of the machine 20 is a paper tray generally and partially indicated at 89 in Fig. 1. Copy sheets that are to be fed through the machine are stacked on this forward tray 89 and are fed one at a time between feed rollers 80 and 81 in a well-known manner. The feed rollers 80 and 81 are caused to rotate when the machine is operated through suitable gearing (not shown) with the hand crank 27 illustrated in Fig. 9 and then each sheet is individually fed by the feed rollers 80 and 81 into the bite between pressure roller 30 and the drum 24. During this time the drum 24 is rotated and the typed material contained on the master sheet that is mounted on the drum is transferred onto the copy sheet thus passing between pressure roller 30 and the drum 24. The copy sheet leaving the drum 24 is then deposited in a paper tray that is generally indicated at 90 in Fig. 1. This paper tray 90 serves both as a receiving tray for the paper and as a cover for the machine as will be hereinafter more fully described.

Figure 14:
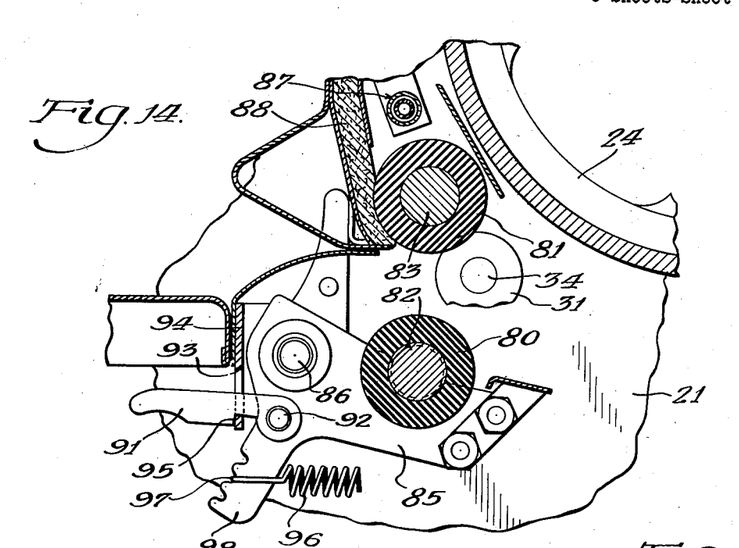
Fig. 14 is a view corresponding with fragments of Fig. 12 but illustrating the lower feed roller in its lowered position.

As previously mentioned the cradles 85 are adapted to pivot about their pivot points 86 and carry with them the lower feed roller 80 so as to move the lower feed roller 80 with respect to the upper feed roller or moistening roller 81 from the position shown for example in Fig. 1 where the two rollers are in engagement to a separated position illustrated in Fig. 14. A pair of spaced grasping arms 91 is provided for manipulating the cradles 85, each grasping arm 91 being pivotally mounted as at 92 to the corresponding cradle 85. As shown in Fig. 14 the grasping arms project through an aperture 93 in a plate 94 and a shoulder 95 is disposed on the lower edge of each grasping arm 91 which locks against the bottom edge of the plate 94 as best shown in Fig. 14 when the cradle 85 is disposed in its retracted position. A tension spring 96 is fastened at one end as at 97 to an arm 98 that projects downwardly from each cradle 85 and at its other end is secured to a lug 99 that projects inwardly from the side wall 21 of the machine frame. The spaced cradles 85 are connected together to operate as a unit by a cross brace and the cradles 85 are normally held in their upper positions with the feed rollers 80 and 81 in engagement by the spring 96. To release the cradles 85 when they are in their retracted position shown in Fig. 14 the grasping arms 91 are raised at their free ends so as to disengage the shoulder portions 95 of the grasping arms 91 from the lower margin of plate 94. The spring 96 then returns the cradles to their normal position shown in Fig. 1. The plate 94 is provided with inturned flanges 94a at its opposite ends which in turn are screwed at 100 to the spaced side walls 21 of the machine (see Fig. 13).

Figures 10, 11:
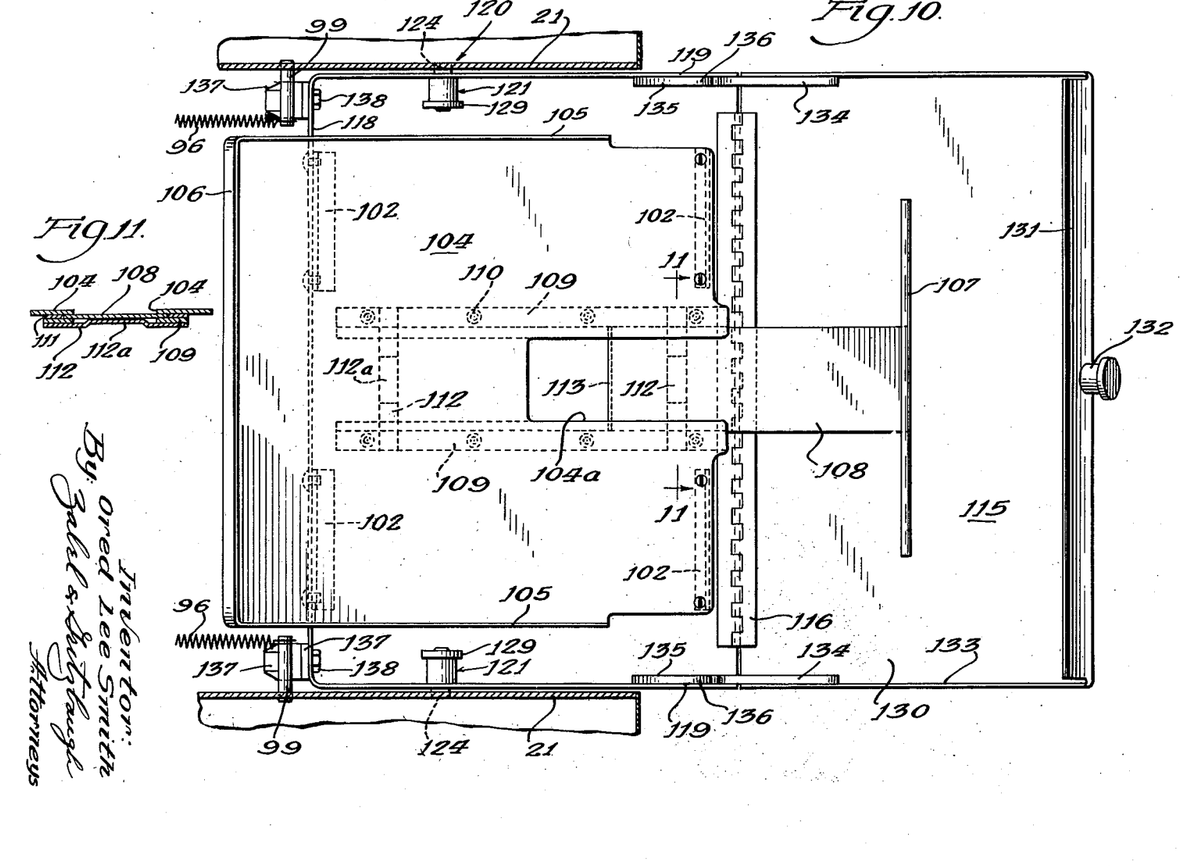
Fig. 10 is a fragmentary, horizontal, sectional view through the machine, the view being taken along the line 10—10 of Fig. 1, a portion of the machine being illustrated as a plan view.
Fig. 11 is a fragmentary, vertical, transverse, sectional view through the machine, the view being taken along the line 11—11 of Fig. 10.

Referring now to Figs. 1, 3, 10 and 12 the combination receiving tray and cover 90 comprises generally a tray portion indicated at 101 that is fastened by means of a plurality of angle clips 102 that may be welded to a cover portion generally indicated at 103. This tray 101 comprises a bottom wall 104, side walls 105 and end wall 106 which all cooperate to form a pan-like tray. The fourth side of the tray 101 is closed by an upstanding wall 107 that is provided on a plate 108 that is mounted to slide in a drawer-like fashion with respect to the bottom wall 104 of the tray. A pair of retaining strips 109 (see Figs. 10 and 11) are fastened as by bolts 110 to the underneath face of the tray bottom 104 and these strips 109 are disposed at the opposite side edges of the sliding plate 108 and actually engage the underneath face of the plate to retain it in place. As shown in Fig. 11 guide strips 111 of some hardened material are provided, one on each side of the sliding plate 108 and actually abut against the sides of the plate to form tracks between which the plate can slide. A pair of spaced straps 112 shown in Figs. 10 and 11 are secured against the underneath face of the strips 109 and are upraised in the center portion as at 112a so as to engage the underneath face of the sliding plate 108 to provide friction during movement of the plate 108. The sliding plate 108 has a downturned flange on its inner end as is indicated at 113 that engages the edge of the straps 112 in both extreme positions of the sliding plate 108 so as to limit the movement of this plate. The tray bottom 104 is cut out to provide an elongated slot 104a shown in Fig. 10.

The cover member 103 includes a lower cover segment 114 and an upper cover segment 115 hinged together as at 116. The lower cover segment 114 comprises a bottom or outer wall 117 that turns up at its inner or lower end to form an end wall 118 and a pair of spaced side walls 119 (see Figs. 1 and 10). The spaced side walls 119 project upwardly to a position adjacent to the side walls 105 of the paper tray member 101. The combination receiving tray and cover 90 is pivotally mounted as at 120 (Fig. 1) to the side walls 21 of the machine frame. Each of these pivot points 120 is formed by a pivot assembly shown generally at 121 in Fig. 2 that includes a cylindrical housing 122 that is secured onto a side wall 119 of the tray member 101 over an aperture in the wall. A plunger 123 is mounted in the cylindrical housing 122 and is provided with an enlarged head portion 124 that projects through the aperture in wall 119 and into an aperture 125 in the adjacent side wall 21 of the machine frame. An annular shoulder 126 is provided at the outer end of the cylindrical housing 122 and mounted concentrically about plunger 123 and seated between the shoulder 126 and the inner edge of plunger head 124 is a compression spring 127 that normally holds the plunger head 124 in its extended position shown in Fig. 2. To the free end of the plunger 123 is attached as at 128 a head or knob 129 that is adapted to move with the plunger 123.

The upper or outer cover segment 115 comprises a body or outer wall 130 that is bent inwardly at its free end to form a front wall for the cover indicated at 131 to which is attached a knob 132. The cover segment 115 is further provided with spaced side walls 133. Projecting rearwardly from each of the side walls 133 is an arm 134 and projecting inwardly or upwardly from each of the side walls 119 of the inner or lower cover segment is a hook member 135 that is provided with a head portion 136 that is adapted to engage the free end of the corresponding arm 134 that projects inwardly from the adjacent side wall 133 of the upper or outer cover segment 115.

Figures 3, 4:
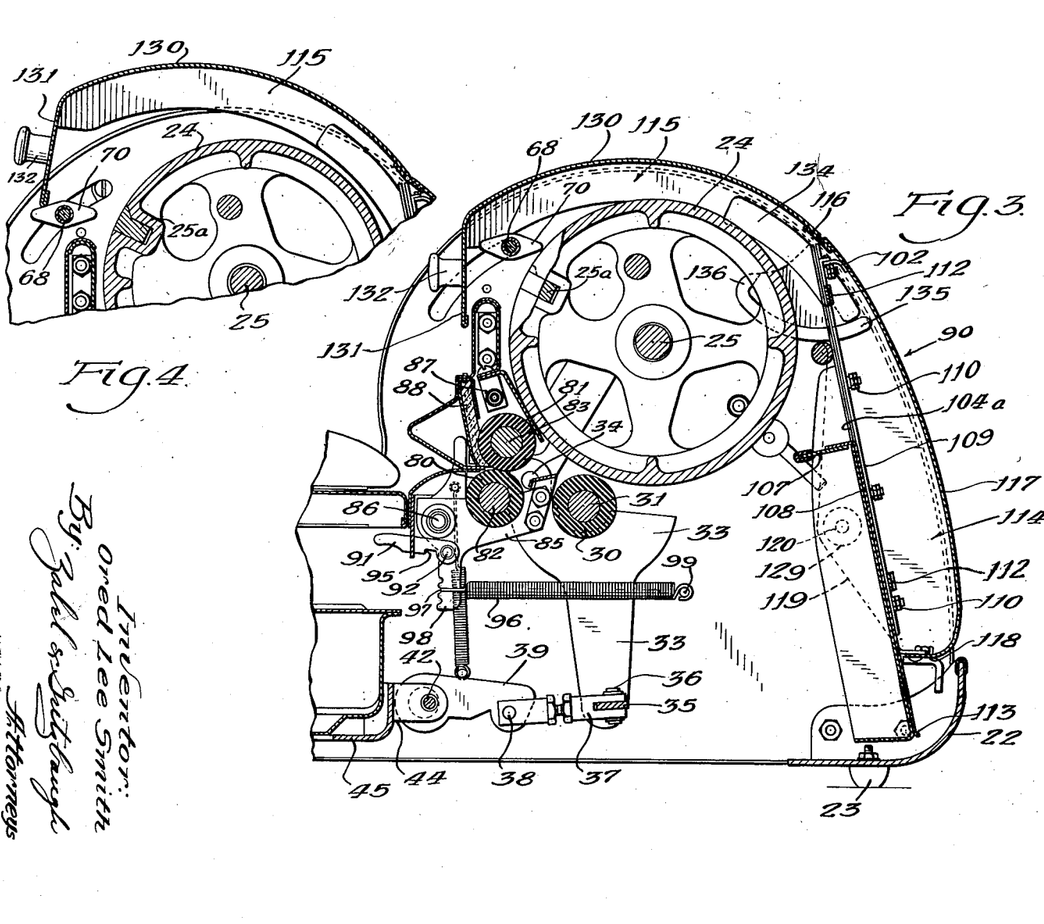
Fig. 3 is a view corresponding to Fig. 1 but illustrating the combination receiving tray and cover in its fully closed position, the view being taken along the line 3—3 of Fig. 6.
Fig. 4 is a fragmentary view corresponding to Fig. 3 but showing the combination receiving tray and cover in its partially closed position abutting against the movable stop that forms part of the pressure release mechanism for the pressure roller.

The entire combination receiving tray and cover assembly 90 is adapted to rotate about the pivot points indicated at 120 from an open position shown for example in Fig. 1 of the drawings to a closed position shown in Fig. 3. To effect this movement the operator of the machine grasps the knob 132 shown in Fig. 1 and first rotates the upper or outer cover segment 115 about the pivot formed by hinge 116 until the outer or bottom wall 130 forms substantially a continuation of and is flush with the outer or bottom wall 117 of the lower cover segment 114. Before this operation can be effected however, sliding plate 108 must be pushed inwardly to the relative position shown in Fig. 3. Next the operator continues to rotate the assembly 90 by grasping the knob 132 so as to rotate the entire assembly in a counter-clockwise direction about the pivot points 120 until the combination receiving tray and cover assumes the position shown in Fig. 3. The machine is completely closed when the cover is in the latter position. To open the machine the operation is reversed and when the cover portion 103 assumes the position shown in Fig. 1 the sliding plate 108 is again pulled out to its extended position and the machine is ready for operation with the paper tray portion 101 in condition to receive copy sheets as they are discharged from the machine drum 24. As shown in Figs. 1 and 10 an angle member 137 is bolted or riveted as at 138 to the rear wall 118 of the lower cover portion 114, one angle member being disposed adjacent to each of the side walls 119 of the lower cover portion. Each angle member 137 is adapted to engage the corresponding lug 99 when the combination receiving tray and cover assembly 90 is disposed in its open position shown in Fig. 1 so as to support this assembly.

Figures 6, 7:
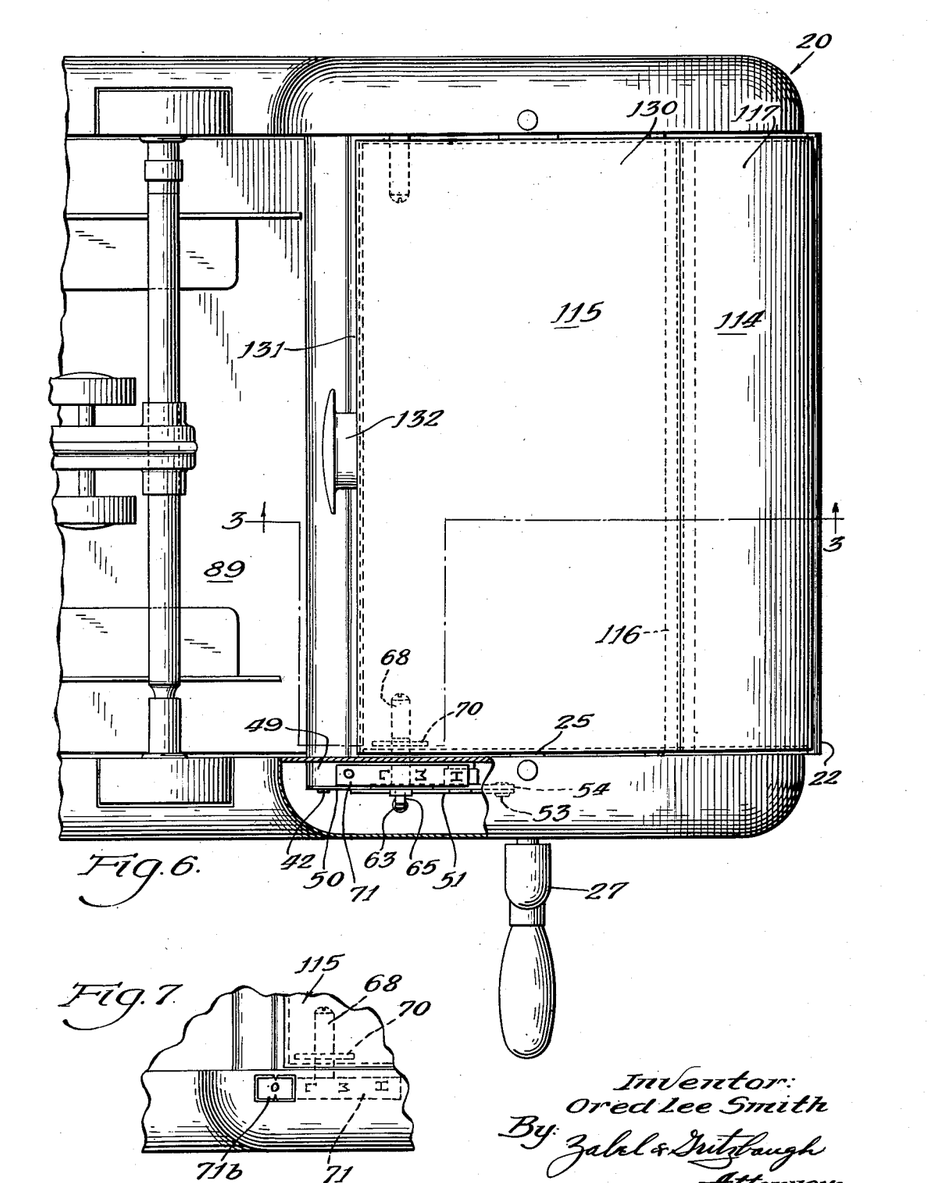
Fig. 6 is a fragmentary top plan view of the duplicating machine embodying the present invention with a portion of the machine broken away.
Fig. 7 is a fragmentary, plan view of that portion of the machine that is broken away in Fig. 6.

As shown in Fig. 3 when the combination receiving tray and cover 90 is in its fully closed position the movable stop 70 is located at its extreme right hand position corresponding to the "O" position marked on the indicating plate 71 in Fig. 6. Under these conditions the pressure roller 30 is in its retracted position when the pressure roller 30 is completely out of pressure engagement with the drum 24 as previously described. After the stop member 70 is in any of the other positions indicated by the letters L, M or H on the indicating plate 71 shown in Fig. 6 so that the pressure roller 30 is in pressure contact with the drum 24, then the lower edge of the front wall 131 (see Fig. 4) abuts against the movable stop member 70 to prevent final closing of the upper cover portion 115. Thus the machine operator is immediately reminded that the pressure roller 30 has not been released from the pressure contact of the drum 24 and in order to completely close the machine it is necessary for the operator to slightly raise the cover portion 115 and move the movable stop 70 by manipulation of operating lever 68 (Figs. 15 and 16) to the position shown in Fig. 3. The machine cover can then be completely closed.

The combination receiving tray and cover 90 can be entirely removed from the machine. This is accomplished by grasping the knobs 129 on each side of the assembly (one being shown in Fig. 2) and pulling the knobs inwardly so as to retract the plunger head 124 entirely out of the apertures 125 in side walls 21 of the machine. The assembly 90 is then rotated slightly so as to disengage the angle members 137 (see Fig. 1) from the adjacent lugs 99 and then the entire assembly 90 is moved rearwardly and withdrawn from the machine.

I claim:

1. A duplicating machine including a frame having spaced side members, a drum rotatably journaled in said frame, a pressure roll journaled in said frame and engaging the drum at a point beneath the same, and a combination receiving tray and cover adapted to assume either one of two positions, said combination tray and cover including a first cover member, pivot means connecting said first cover member with said side members whereby said cover member may be swung from a substantially horizontal position into a substantially upright position in which the upper end of said cover member is disposed adjacent the back side of said drum, a second cover member hingedly mounted on said first cover member at said upper end and being adapted to project forwardly, when said first cover member is in upright position, so that said second cover member overlies said drum and cooperates with said first cover member to enclose the rear and top of the duplicating machine, said second cover member being movable with respect to said first cover member so that when said first cover member is in its substantially horizontal position said second cover member may also be disposed in substantially horizontal position thereby forming an extension of said first cover member, and a tray member mounted on said first cover member and being movable with said first cover member, the front end of said tray, when said cover member is in substantially horizontal position, being disposed immediately back of said pressure roll, whereby movement of said cover member from upright position to horizontal position will cause said tray member to be moved into operative position with respect to the bite of said drum and pressure roll so that it will receive copy sheets passing through said bite.

2. A duplicating machine as claimed in claim 1 in which said tray member is provided with a slidable tray segment, an upstanding wall carried by said tray segment for confining the sheets delivered to said tray, said slidable tray segment being extendible rearwardly beyond said first cover member into a position overlying said second cover member when the latter is disposed in its horizontal position, and said slidable tray segment being movable forwardly to a position in which it clears said second cover member so as to permit movement thereof into its forwardly extending cover position.

3. A duplicating machine including a frame having spaced side members, a drum rotatably journaled in said frame, a pressure roll journaled in said frame and engaging the drum at a point beneath the same, and a combination receiving tray and cover adapted to assume either one of two positions, said combination tray and cover including a first cover member having a pair of spaced side walls disposed adjacent said side members and interiorly thereof, pivot means connecting said side walls with said side members whereby said cover member may be swung from a substantially horizontal position into a substantially upright position in which the upper end of said cover member is disposed adjacent the back side of said drum, a second cover member hingedly mounted on said first cover member at said upper end and being adapted to project forwardly, when said first cover member is in upright position, so that said second cover member overlies said drum, means for limiting the relative movement of said second cover member with respect to said first cover member when said first cover member is in its substantially horizontal position so that said second cover member will also be disposed in substantially horizontal position thereby forming an extension of said first cover member, and a tray member mounted on said first cover member between the side walls thereof and being movable with said first cover member, said tray being provided with an end wall which, when said cover member is in substantially horizontal position, is disposed immediately back of said pressure roll, and being provided with side walls by means of which copy sheets may be confined within said tray whereby movement of said cover member from upright position to horizontal position will cause said tray member to be moved into operative position with respect to the bite of said drum and pressure roll so that it will receive copy sheets passing through said bite.

ORED LEE SMITH.

REFERENCES CITED

The following references are of record in the file of this patent:

UNITED STATES PATENTS

| Number | Name | Date |
|---|---|---|
| 750,863 | Klaber | Feb. 2, 1904 |
| 1,666,193 | Brasseur | Apr. 17, 1928 |
| 2,105,195 | Marchev et al. | Jan. 11, 1938 |
| 2,231,639 | Ritzerfeld | Feb. 11, 1941 |
| 2,233,895 | Mestre | Mar. 4, 1941 |
| 2,399,176 | Ford | Apr. 30, 1946 |
| 2,558,046 | Geib | June 26, 1951 |